United States Patent
Hamilton et al.

(10) Patent No.: US 6,687,717 B1
(45) Date of Patent: Feb. 3, 2004

(54) COMPONENT ALIASING OPERATING WITHIN A COMPONENT-BASED COMPUTING SYSTEM

(75) Inventors: Keith S. Hamilton, Sammamish, WA (US); Steve Jamieson, Kirkland, WA (US); Joe D. Long, Woodinville, WA (US); Paul M. Oeuvray, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 236 days.

(21) Appl. No.: 09/850,329

(22) Filed: May 7, 2001

(51) Int. Cl.[7] .......................... G06F 17/30; G06F 12/00
(52) U.S. Cl. .................. 707/203; 707/10; 707/104.1; 709/203; 709/205; 709/217; 709/219; 709/229; 709/245; 713/200; 713/201
(58) Field of Search .................. 707/203, 10, 104.1; 709/245, 203, 205, 217, 219, 229, 246; 713/200, 201; 370/401

(56) References Cited

U.S. PATENT DOCUMENTS

| | | | | |
|---|---|---|---|---|
| 5,941,943 A | * | 8/1999 | Brenner et al. ............. | 709/201 |
| 6,457,060 B1 | * | 9/2002 | Martin et al. ............... | 709/245 |
| 6,509,913 B2 | * | 1/2003 | Martin, Jr. et al. .......... | 345/762 |
| 6,557,068 B2 | * | 4/2003 | Riley et al. ................. | 710/306 |
| 2002/0113899 A1 | * | 8/2002 | Swan .......................... | 348/607 |
| 2002/0122061 A1 | * | 9/2002 | Martin, Jr. et al. .......... | 345/762 |

OTHER PUBLICATIONS

Clarke et al., Ownership Types for Flexible Alias Protection, ACM, Oct. 1998, pp. 48–64.*

* cited by examiner

*Primary Examiner*—Frantz Coby
(74) *Attorney, Agent, or Firm*—Merchant & Gould P.C.

(57) ABSTRACT

A method, apparatus, and article of manufacture for providing a component-based computing system having programmable components and component aliases for identifying computing components for providing component addressing/identification and naming spaces is disclosed. The computing system has a partition activation control module for receiving a request to activate a component initiated by a calling component and activating an instance of the requested component, a permit object activation module for determining whether an instance of the requested component may be activated, a component object alias activation module for substituting a unique component class ID for a component alias class ID if the requested component corresponds to a component object alias, a system component catalog database for maintaining component object configuration data, and a component object activation module for activating the requested component. The method determines the identity of the requested processing component, including an identity of a unique component class ID and an identity of a partition from a request to activate a component initiated by a calling component and obtains configuration data for the requested component, the configuration data comprises one or more component parameters for the requested component. If the configuration data indicates that the requested component is a component object alias, the method substitutes a unique component class ID for the component alias class ID and activates an instance of the requested component.

18 Claims, 8 Drawing Sheets

COMPONENT ALIASING OPERATING WITHIN A COMPONENT-BASED COMPUTING SYSTEM

TECHNICAL FIELD

The invention relates generally to a component-based computing system having component aliases, and more particularly to component-based computing system having programmable components and component aliases for identifying and addressing computing components to be activated and referenced within an application.

BACKGROUND

Current component based programming systems implement a variety of different sets of functionality using different components to implement each variation of the programmable functionality. Developers who wish to simply alter one component to provide the additional functionality to a small subset of users typically are required to recompile a significant amount of code in order to assign a new class ID to the newly generated component that implements the new functionality. This need for recompiling components may exist even when the difference may be controlled in using run-time setting controlled using properties configured for the components. The issue preventing an easy reconfiguration of these components is the need for unique class IDs for each different variation of these components.

Because the class ID is currently stored within the binary version of a component, the above recompilation is required to change the class ID. In some situations, administrators may not have access to the source code for a component, especially where the component has been acquired or purchased from an external source. This fact has limited the ability to make new versions, and support multiple versions for a given component.

These problems can be eliminated by using an alias for a component that contains a different class ID than the original component. The alias, itself, can use the same binary representation of the component that simply controls the operation of the component using configuration data associated with the alias. The configuration data may be used to limit access to a component, or to enable, disable, and control the operation of functionality within the component when the component is activated. The alias may be treated as any other component that has its configuration data associated with its operation. The fact that the alias has its own unique class ID permits the alias to be treated as a separate component even when it simply uses the same binary version of an existing component. An alias thus permits the configuration data to be manipulated to achieve the desired behavior and functionality for the application.

SUMMARY

The present invention relates to a code generation method, apparatus, and article of manufacture for providing a component-based computing system having programmable components and component aliases for identifying computing components for providing component addressing/identification and naming spaces.

The present invention solves the above-described problems by providing a computing system for activating a requested processing component initiated by a calling component within a local computing system. The computing system has a partition activation control module for receiving a request to activate a component initiated by a calling component and activating an instance of the requested component, a permit object activation module for determining whether an instance of the requested component may be activated, a component object alias activation module for substituting a unique component class ID for component alias class ID if the requested component corresponds to a component object alias, a system component catalog database for maintaining component object configuration data, and a component object activation module for activating the requested component.

Other embodiments of a system in accordance with the principles of the invention may include alternative or optional additional aspects. One such aspect of the present invention is a computer implemented method and corresponding computer data product of activating a requested processing component initiated by a calling component within a computing system. The method determines the identity of the requested processing component, including an identity of a unique component class ID and an identity of a partition from a request to activate a component initiated by a calling component and obtains configuration data for the requested component, the configuration data comprises one or more component parameters for the requested component. If the configuration data indicates that the requested component is a component object alias, the method substitutes the unique component class ID for a component alias class ID and activates an instance of the requested component.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION

The present invention relates to a code generation method, apparatus, and article of manufacture for providing a component-based computing system having programmable components and component aliases for identifying computing components to be activated within applications/ constructing using component objects.

Figure 1:
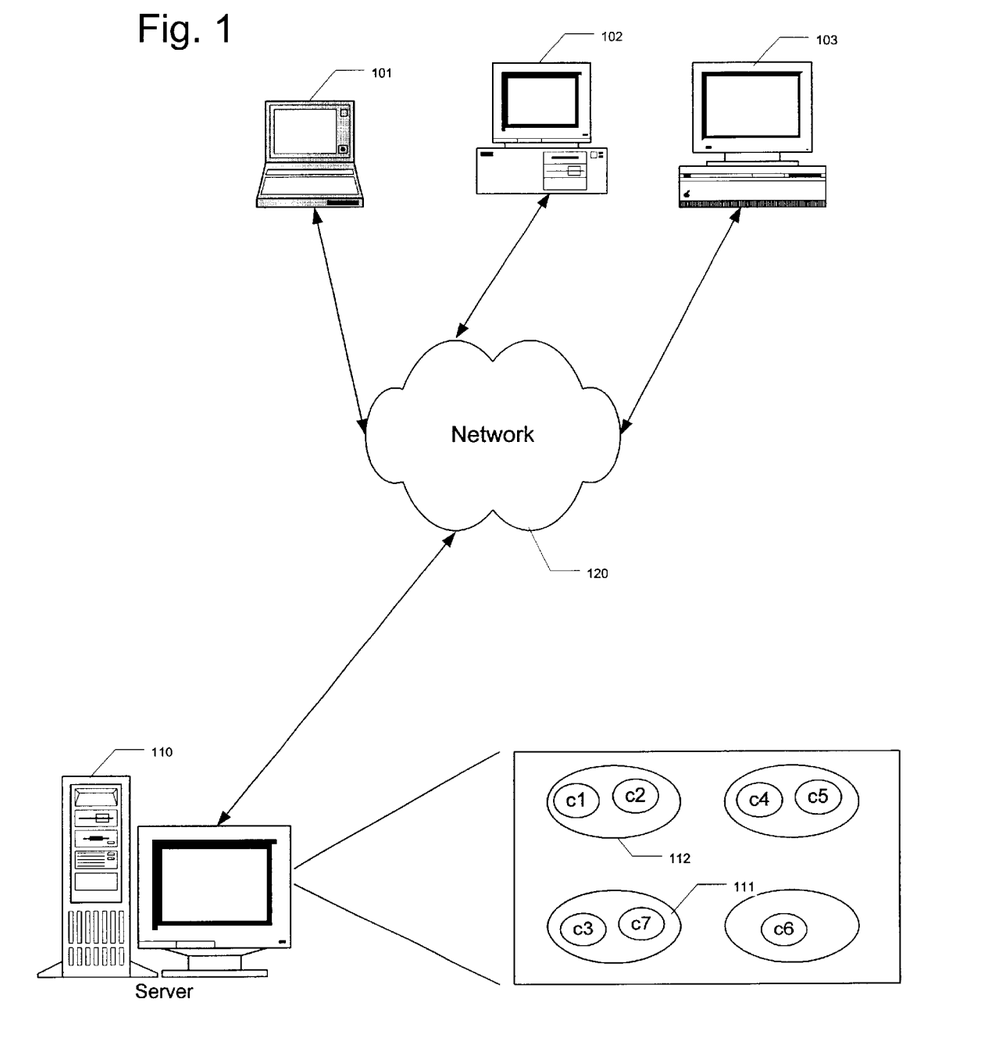
FIG. 1 illustrates a distributed computing environment for using aliasing computing components within component based computing applications according to an example embodiment of the present invention.

FIG. 1 illustrates a distributed computing environment for using programmable components and component aliases within one or more programmable applications located on a remote server according to an example embodiment of the present invention. In an exemplary embodiment, remotely located client computing systems 101–103 access programmable computing processing components on a remote server 110 across a communications network 120. Within the server 110, one or more programming applications are included.

A computing system provides a name space and class ID space for the components located within the computing system. The name space, however, does not span more than one system. Associated with these components are programmable properties that are used to control the behavior of one or more run time property of the component used to control the operation and behavior of the component. Two components may be similar in the fact that both use the same set of programmable instructions found within a dynamically-linked library with the only difference being a value for one of these property settings. For this situation, two separate components are maintained within the computing systems.

When an active component on the server 110 needs to activate additional components to complete one or more processing tasks, the component selected for activation uses the identity of the original calling client to determine where to find the component to be activated. While this example embodiment operates within a client-server environment, one skilled in the art will recognize that the use of partitions as disclosed herein is not limited to such a programming environment as the client processes that cause components to be activated according to the present invention as recited within the attached claims may also be located within the server as well as being located within remote client computing systems 101–103.

The processing performed pursuant to the present invention corresponds to the process followed when a component is activated. These components are typically individual object-oriented programming modules and the process of activating a component corresponds to the process of creating an instance of the component that is to be used to provide a function or operation to be performed for a given client 101–103. Once a component has been instantiated and is active, the instance of the component may be called one or more times to perform a desired operation. However, the processing associated with the present invention typically concerns the processing performed to identify the component when it is being activated and instantiated, rather than when the already active instance of the component is called a second time. According to the present invention, developers specify that the above process occurs upon a component logically specified to be present within its respective application. These logical components, however, may include both actual programmable components and component aliases. Both of these types of component objects reference physical classes stored on the server 110; however, a distinction is made between the physical component object and the logical component objects that maintain a one-to-one binding using a component object catalog.

Figure 2:
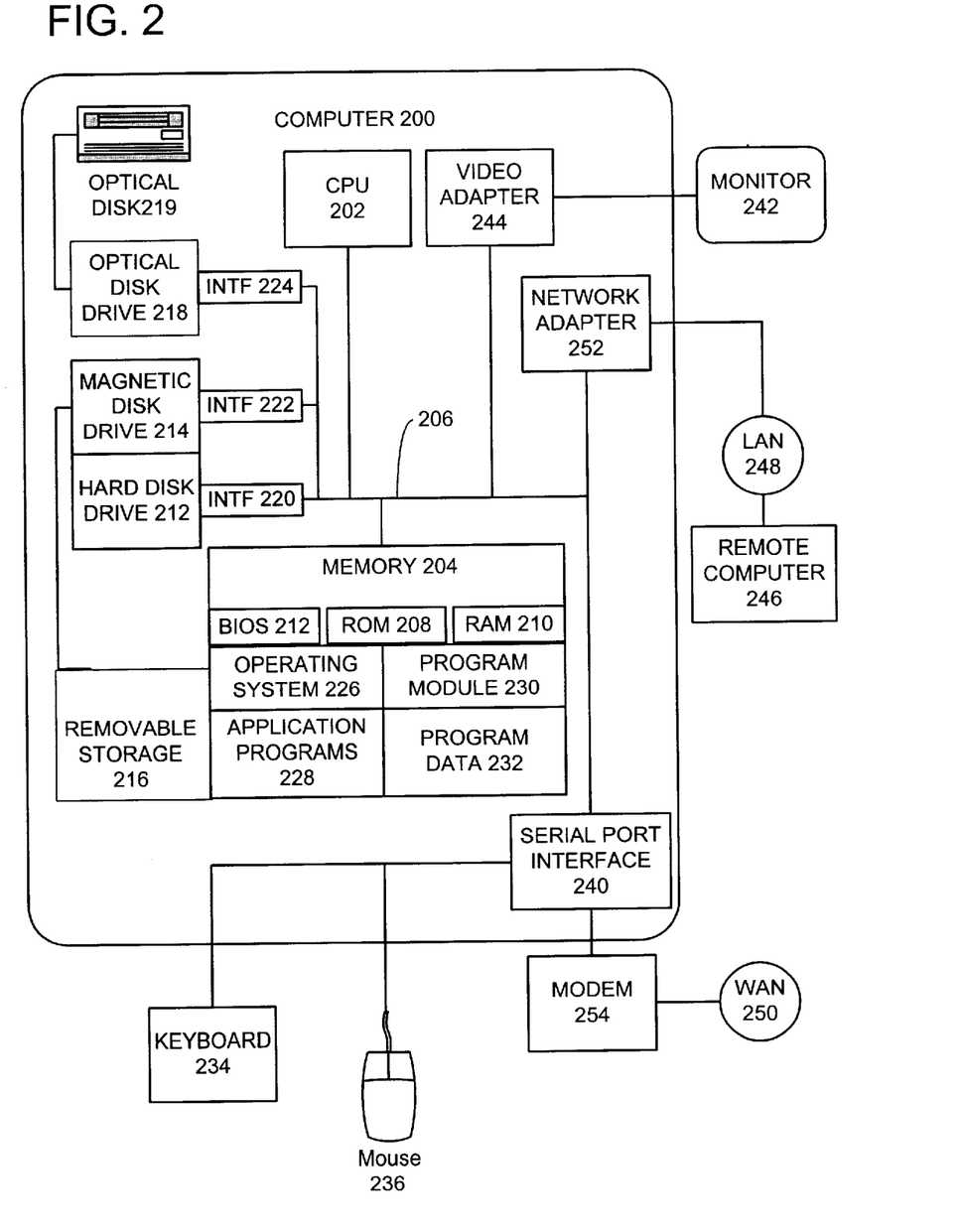
FIG. 2 illustrates an exemplary computing system useful for implementing an embodiment of the present invention.

With reference to FIG. 2, an exemplary system for implementing the invention includes a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 3:
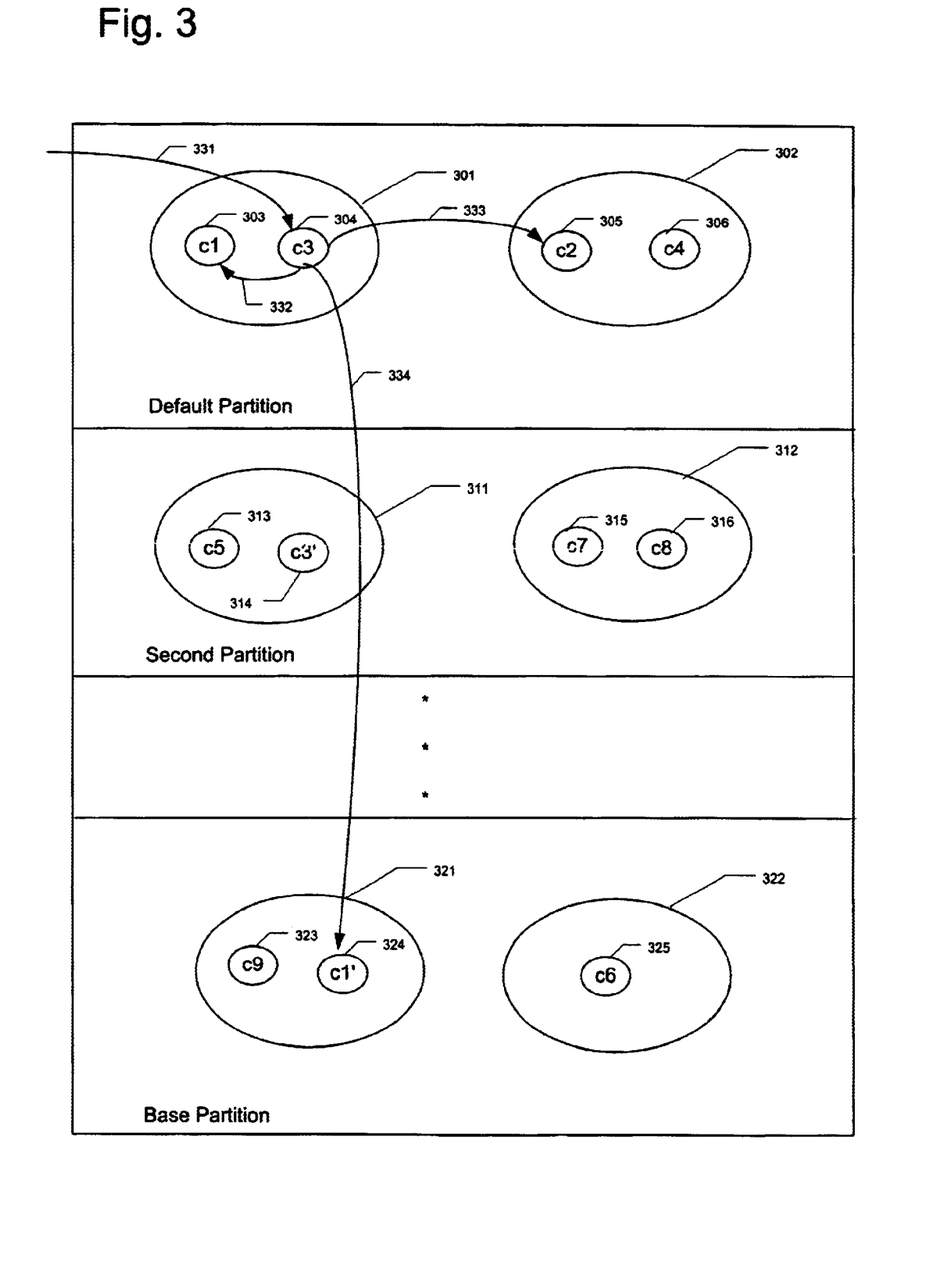
FIG. 3 illustrates multiple applications containing programmable components that may be activated within a remote server in an embodiment of the present invention.

FIG. 3 illustrates multiple applications containing programmable components within a remote server in an embodiment of the present invention. Each of these applications 301–302, 311–312, 321–322 may itself contain one or more programmable components 303–306. The individual components 303–306 are the items being activated. These components may either be programmable components 303–306, or component aliases of components 314, 324. Once an alias component 314 is created, the operation of activating and using this alias component 314 is not different from the activation and use of the original component 304 from which the alias was created.

In this example, an external activation call 331 is received by component C3 304 within application 301. This component C3 304, itself may make activation calls to other components such as C1 303, within its own application 301. This component may activate a component C2 305 in another application 302, or activate an alias component C1' 324 in a third application 321.

Figure 4:
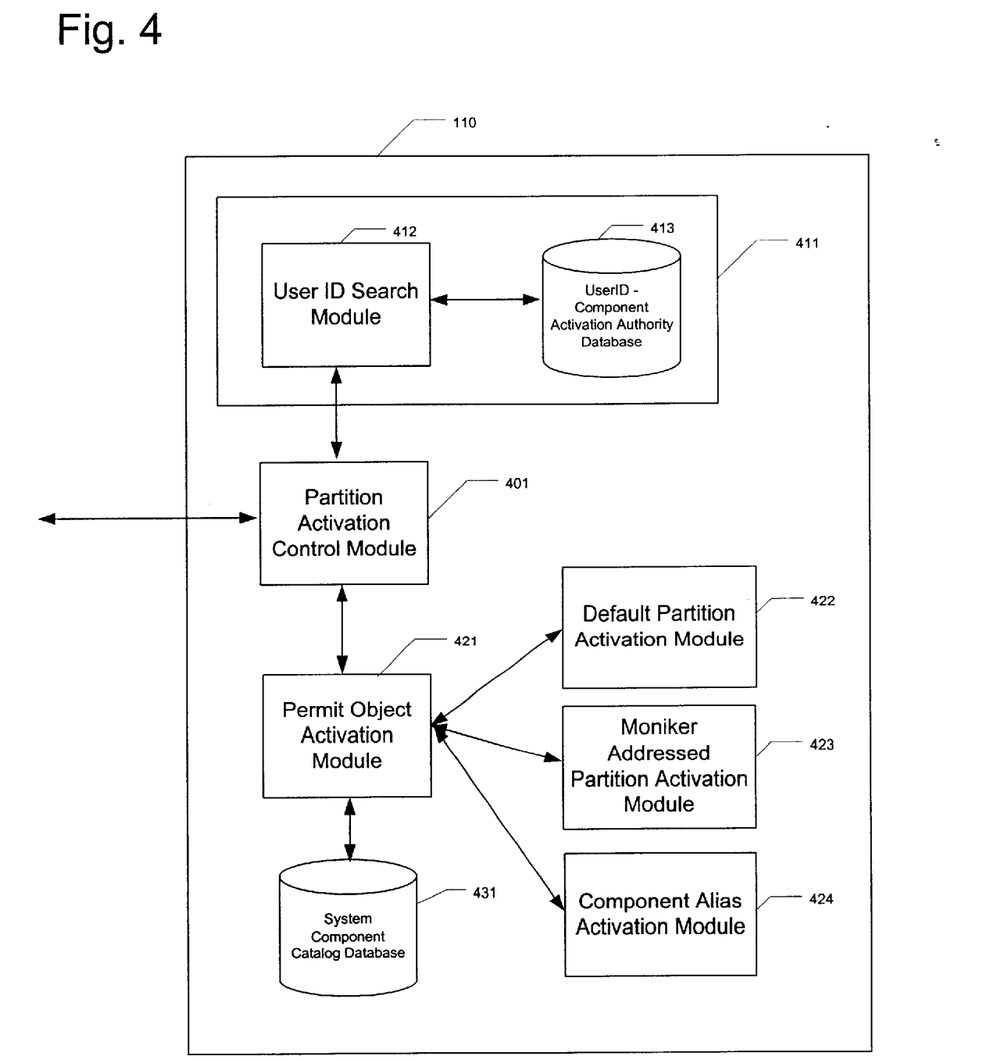
FIG. 4 illustrates a computing system for processing component activation within multiple applications according to another example embodiment of the present invention.

FIG. 4 illustrates a computing system for processing component activation within multiple applications according to another example embodiment of the present invention. Calls that require the activation of a component are received by an application activation control module 401. The control module 401 first determines the component to be used and then activates the appropriate component.

The control module 401 obtains activation authority information from a component identity module 411. This module 411 contains a user ID search module 412 and a user ID-component activation database 413 to determine the needed information. The user ID search module 412 receives a request from the control module 401 and looks up the ID of the user making the request to activate a component in the database 413. If a match is found, the corresponding activation authority information is retrieved and returned to the control module 401 for further processing. If no match is found, either an error or a default value is returned.

In the exemplary embodiment, the component identity module 411 corresponds to a directory service typically found on networks for providing user ID based configuration and security data. The component identity module 411 is typically a centrally located data store that provides the requested information upon request. One skilled in the art will recognize that this database may be located anywhere in the computing system so long as it provides the information needed by the present invention as recited within the attached claims.

The control module 401 uses the returned activation authority information to cause a permit object activation module 421 to activate an instance of the requested component. The activation module 421 uses a moniker addressed partition activation module 423 to activate an instance of a component using a partition moniker to specify the partition ID to be used. Finally, The activation module 421 uses a component alias activation module 424 to activate an instance of a component using the component properties stored within a system component catalog 431. Other activation mechanisms may be implemented by using other component activation modules 422–423.

Figure 5:
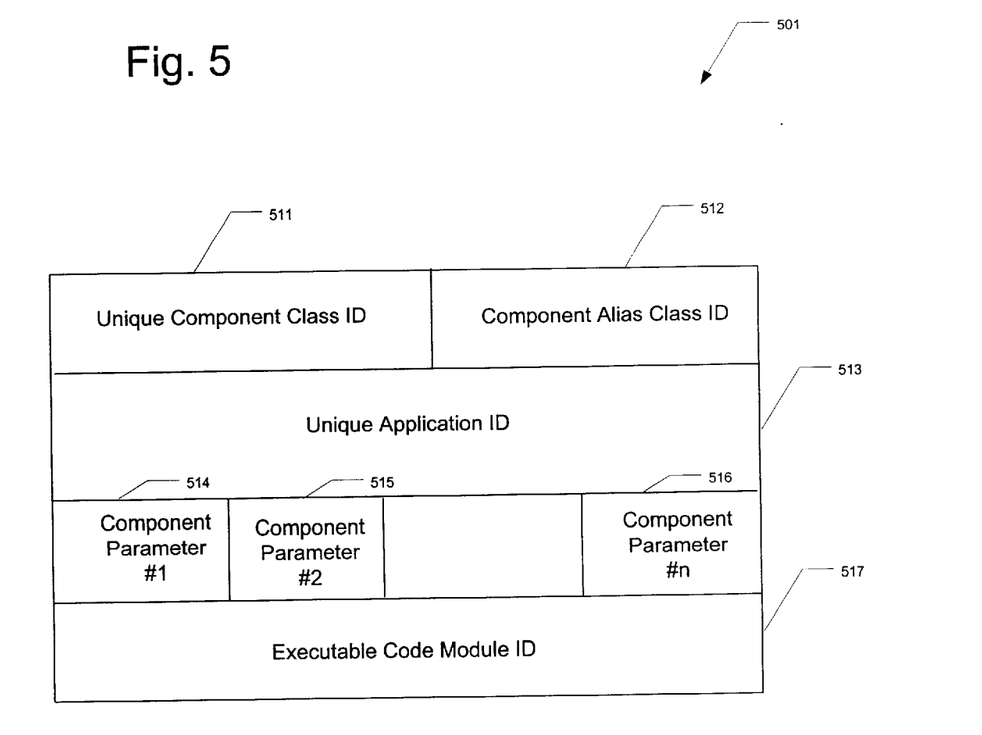
FIG. 5 illustrates a catalog entry for a programmable component and component alias according to yet another example embodiment of the present invention.

FIG. 5 illustrates a catalog entry for a programmable component and component alias according to yet another example embodiment of the present invention. In order to maintain the logical and physical separation between logical component objects and component object aliases and their corresponding physical class objects, a system component catalog 431 is used to maintain data necessary to bind these objects together. Every logical component object will maintain a catalog entry within the catalog database in order to bind the logical object to a physical class for execution.

The catalog entry 501 has a set of data fields, the first two of which are a Unique Component Class ID 511 and a Component Alias Class ID 512. The component class alias 512 is the actual CLSID used by the client to activate the component. This class ID must resolve to a real, physical, unique CLSID, Unique Component Class ID 511, that is coded into a dynamic link library. There may be a many to one mapping between component aliases and the single physical class ID. There may be many aliases for one real class ID. In this particular embodiment, a component object alias is distinguished from a actual component object when these two fields contain references to different class IDs. When the two fields contain the same class ID, the corresponding component object is not an alias. When the two fields do not contain the same class ID, the corresponding component object is a component object alias where the alias is between the alias class ID and its properties and the actual component object class.

One skilled in the art will recognize that other schemes to specify an alias may be used without deviating from the claimed invention as recited within the attached claims. For example, a component object that is not an alias may store a <null> value within the Component Alias Class ID field 512 rather than the same class ID value found within the Unique Component Class ID field 511. Similarly, the catalog entry 501 may expressly maintain a single bit field to indicate whether the component object corresponds to an alias or not. All of these implementation details are within the design options and choices made by one skilled in the art when optimizing the system performance for a particular operating environment.

The catalog entry 501 also contains a field 513 that specifies a Unique Component Application ID in the systems that maintain and utilize multiple applications. The catalog entry 501 contains a set of one or more component parameters 514–518 that are used to specify the run-time operation of the component object. When an alias is created, these values are originally copied from the values maintained for the component object class. These parameter values 514–516 are then modified as desired to distinguish the operation of the component object alias from the component object itself. Finally, the catalog entry 501 includes a field that specifies the Executable Code Module ID that corresponds to the physical reference to the module that contains executable code that is to be used when an instance of the component object is activated.

Figure 6:
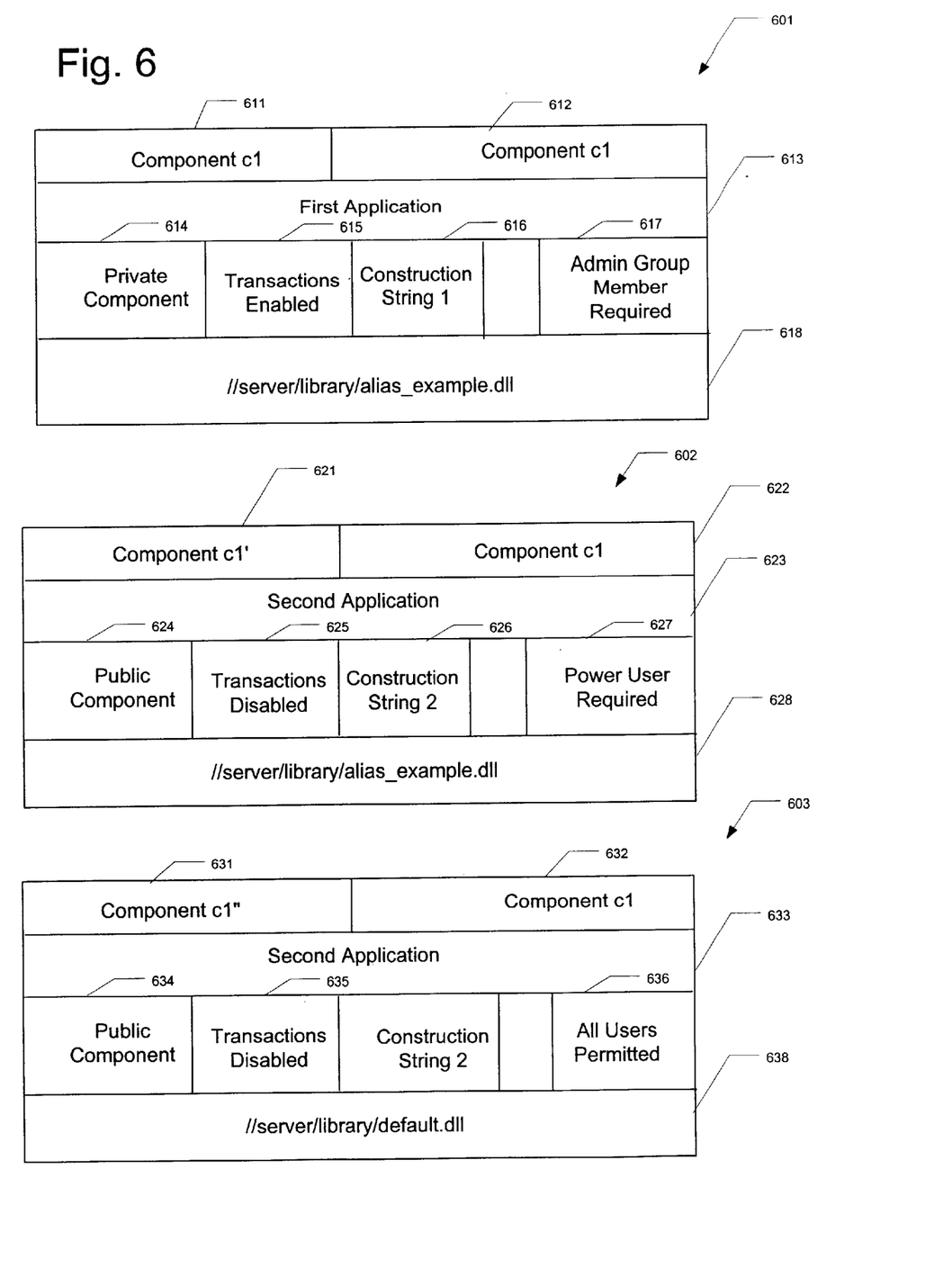
FIG. 6 illustrates a set catalog entries for a programmable component and two component aliases according to yet another example embodiment of the present invention.

FIG. 6 illustrates a set of catalog entries for a programmable component and two component aliases according to yet another example embodiment of the present invention. The first of the three catalog entries 601 corresponds to a catalog entry for a component object c1. This object is not a component object alias as the unique component class ID field 611 and the component alias class ID field 612 both contain references to component class c1. This component object is located within a first application as indicated within the unique component application ID field 613.

Four different component parameters 614–617 are shown for this catalog entry 601. First, the component object is specified to be a private component 614. Private components correspond to components that may only be activated by a component located within the same application as the component to be activated. These types of components are distinguished from public components which may be activated by any other component. Additional description of public/private components within multiple partitions is described within a commonly assigned U.S. patent application entitled, PUBLIC AND PRIVATE COMPONENTS OPERATING WITHIN MULTIPLE APPLICATIONS OF A COMPONENT-BASED COMPUTING SYSTEM, U.S. Ser. No. 09/850,318, filed May 7, 2001.

The second parameter field 615 contains a parameter specifying that this instance of a component is to use transactions when executed. Within computing systems, such as one that implements the MICROSOFT COM+runtime operating environment, many such operating parameters are set for a component and implemented at run-time by the system itself. Other such system parameters under the COM+environment include object pooling and just in time activation to name just two additional parameters. One skilled in the art will recognize that any system, run-time parameter may be used consistent with the spirit and scope of the present invention as recited within the attached claims. Typically these settings are either enabled or disabled and the parameters maintained within this field indicate which of these parameters are enabled.

The next parameter 616 in the catalog entry 601 contains a construction string that is passed to a component object activator for use when an instance of the component object is activated. This construction string permits a set of configuration data to be passed to the component object for use in a particular instance of the object that may wish to be different a other times. For example, the construction string may contain a reference to the IP address or URL to a database that is to be used when a particular component establishes a connection between the component and the database. In such a case, a component is typically used to establish and initialize the connection to the database. This component may be identical for all instances of establishing a connection to a given type of database except for the unique reference to the particular database in question. A single component may be used to establish such a connection and an alias be used to establish a connection to given database. The identity of the desired database may be stored within the construction string field 616 which is passed to the component when activated. The component may use this string to determine the identity of the desired database at run-time using this reference. Any configuration data may be maintained and passed to a component object using this construction string.

The final parameter 617 illustrated within the catalog entry 601 contains a reference to the administrative authority needed by the user ID requesting that the component be activated. In this example, a user ID for the component requesting the component activation must be a member of an administrator group. This example uses the types of administrative user groups which may be typically found for user IDs in directory services. Any such of organization of users ID, and similar system security settings, may be used in this operation without deviating from the spirit and scope of the present invention as recited within the attached claims.

The final field 618 illustrated within the catalog entry 619 is a reference to a dynamically linked library that contains the executable class object to be used when an instance of the component object is activated. This example field 6118 contains an explicit reference to the .dll file stored on a server that is part of the computing system. Other references to this module may be used without deviating from the spirit and scope of the present invention.

The second catalog entry 602 for component object alias c1' possesses all of the above fields that are used to specify a particular instance of component object c1. The component object is an alias as the first two fields contain a reference to component ID c1' 621 and c1 622. In contrast to the example within catalog entry 601, the component parameters specify this instance to be a public component 624, specify that transactions are not used 675, specify a different construction string 626, and specify that power users 627 rather than administrators may activate the component object. Finally, the component object catalog entry 602 specifies that the same .dll file 628 is used for activating an instance of the component object.

A second component object alias catalog entry 603 illustrates a second instance of an alias for component c1. This component object alias corresponds to a component object alias within a base partition 633 and possesses the same parameters 634–636 as the prior component object catalog entry 602 except that all users 636 may activate this component. Most significantly however, this component object uses a different .dll file 638 to specify the location of the executable component class used to implement this component object alias. Using these constructs, a component alias may completely change the operating parameters as well as the object class for a given reference to a component.

Figure 7:
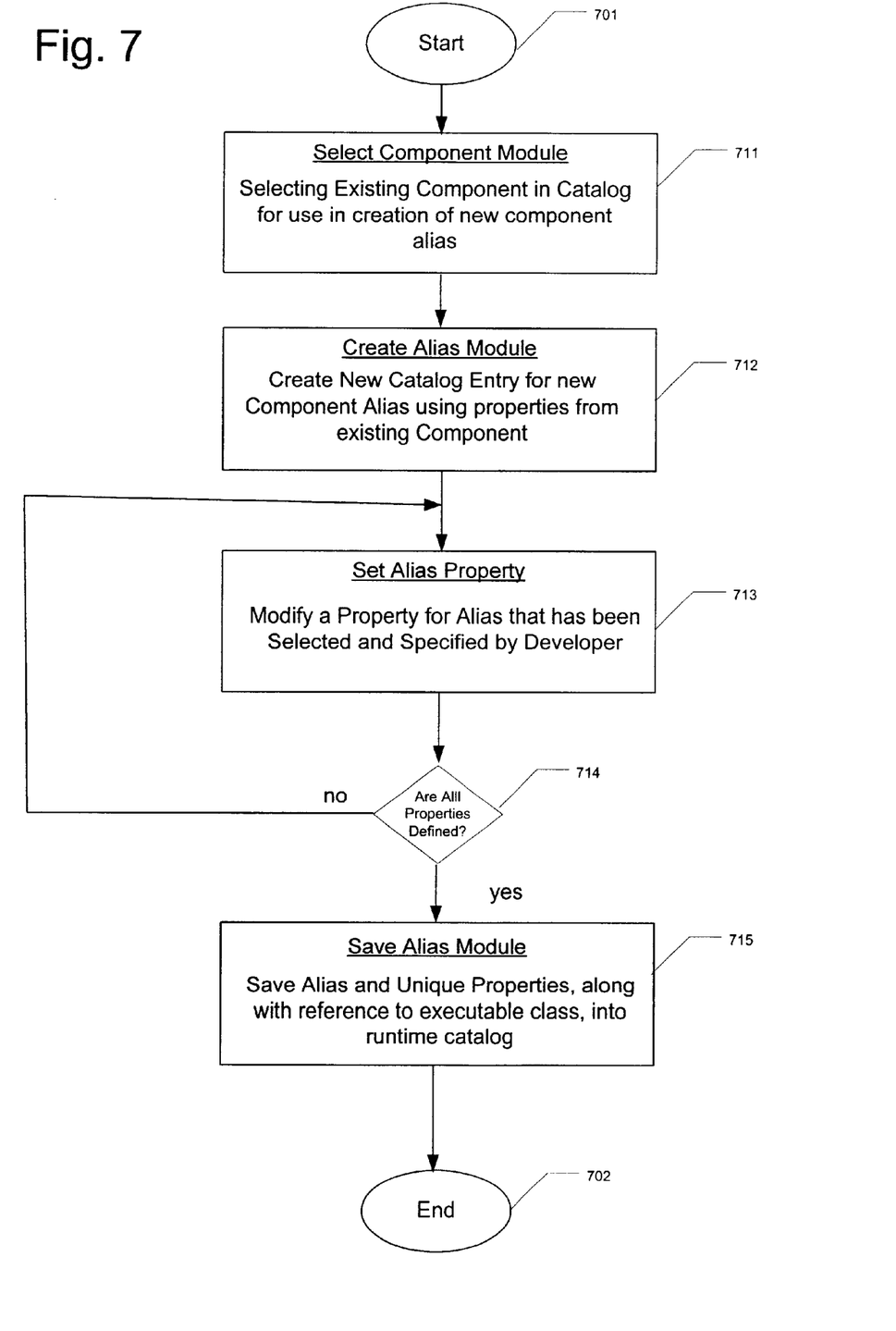
FIG. 7 illustrates a process flow diagram representing the processing performed as part of component alias creation according to yet another example embodiment of the present invention.

FIG. 7 illustrates a process flow diagram representing the processing performed as part of component alias creation according to yet another example embodiment of the present invention. The processing starts 701 and a select component module 711 is used to select an existing-component that exists within the system catalog of components for use in creating an component object alias. Next, a create alias module 712 creates a new component catalog entry and places the parameter values within the catalog entry based upon the values stored in the catalog entry for the selected component object. Once the alias catalog entry is created, the values for the parameters are modified to specify the desired alias.

A processing loop created using a set alias property module 713 and test module 714 permits these parameters to be modified one at a time until the desired component object alias has been specified. At that time, test module 714 terminates the operation of the processing loop and a save alias module 715 stored the updated catalog entry into the system catalog database for use at run-time and the processing ends.

Figure 8:
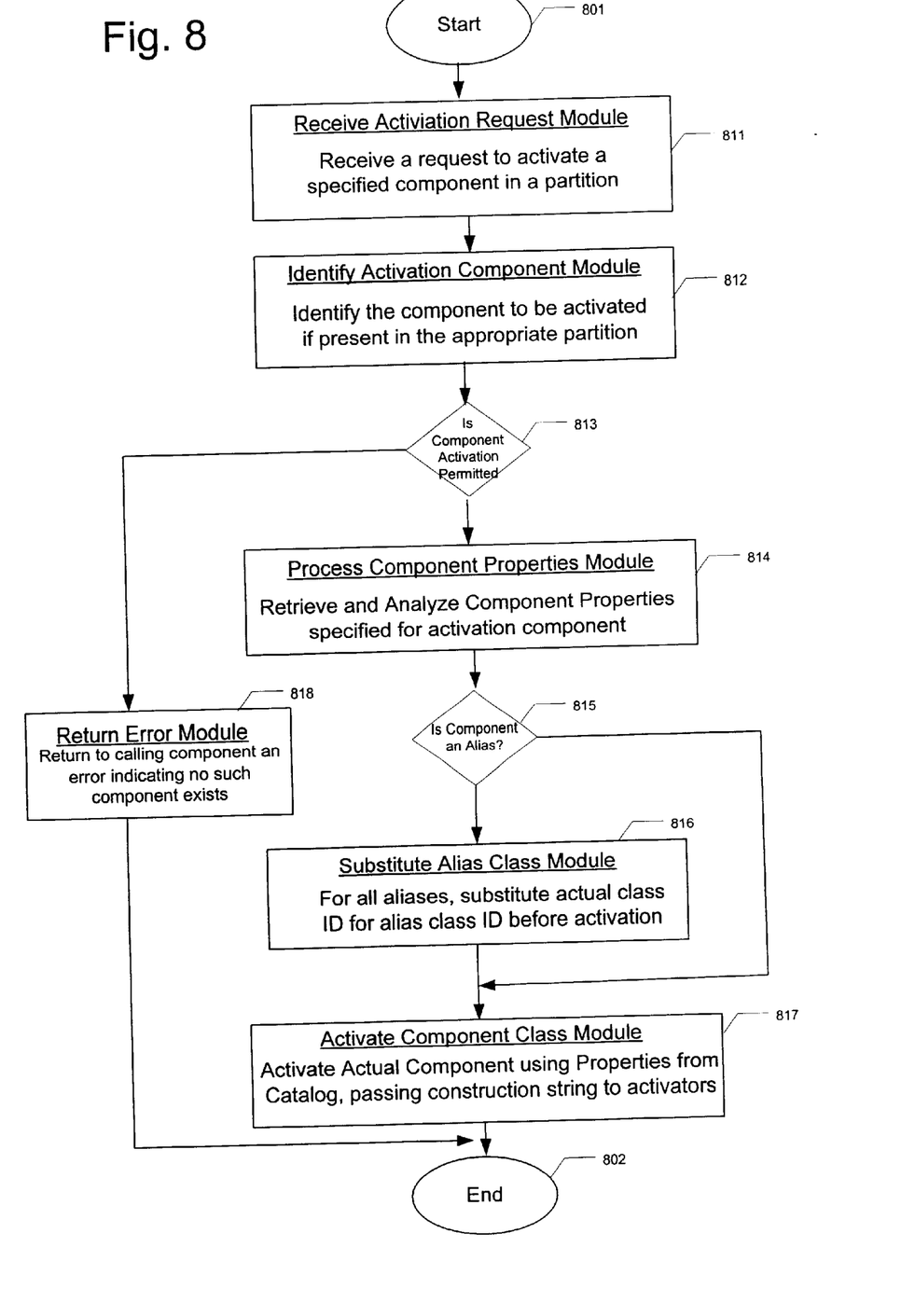
FIG. 8 illustrates a process flow diagram representing the processing performed as part of component activation using programmable components and component aliases within multiple partitions according to yet another example embodiment of the present invention.

FIG. 8 illustrates a process flow diagram representing the processing performed as part of component activation using programmable components and component aliases within multiple applications according to yet another example embodiment of the present invention. The process begins 501 and a receive activation request module 811 receives a request from a component to activate an instance of a specified component object. Once the request has been received, an identify activation component module 812 processes the request to determine the identity of the specified component object and to determine if the specified component may be activated. This module will perform the processing associated with security related activation testing that is needed to determine if a particular request to activate a component object is to be performed.

Test module 813 determines if the requested component object is to be activated. If the test is that the component object is not to be activated, a return error module 814 generates and returns an appropriate error message that no such component object exists and the processing ends 802. If test module 813 determines that the component may be activated, a process component properties module 814 retrieves the component object properties for the requested component object using the unique component class ID. This module performs any security and other activation processing based upon the parameters valued found within catalog entry for the requested component object.

If all of the parameters are successfully processed, test module 815 determines if the requested component object refers to a component object alias. If the requested component object is an alias, substitute alias class module 816 substitutes the actual component class ID stored in the component alias class ID field for the unique component class ID. The requested component is activated by an activate component class module 816 using the executable module referenced in the executable code module ID field of the catalog entry and the processing ends.

If test module 815 determines if the requested component object refers to a component object, the requested component is immediately activated by the activate component class module 816 using the executable module referenced in the executable code module ID field of the catalog entry and the processing once again ends.

FIG. 2 illustrates an example of a suitable operating environment 110 in which the invention may be implemented. The operating environment is only one example of a suitable operating environment 110 and is not intended to suggest any limitation as to the scope of use or functionality of the invention. Other well known computing systems, environments, and/or configurations that may be suitable for use with the invention include, but are not limited to, personal computers, server computers, held-held or laptop devices, multiprocessor systems, microprocessor-based systems, programmable consumer electronics, network PCs, minicomputers, mainframe computers, distributed computing environments that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed in desired in various embodiments.

A network server 110 typically includes at least some form of computer readable media. Computer readable media can be any available media that can be accessed by the network server 110. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by the network server 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

While the above embodiments of the present invention describe a network based processing system providing processing services to remote clients, one skilled in the art will recognize that the various distributed computing architectures may be used to implement the present invention as recited within the attached claims. It is to be understood that other embodiments may be utilized and operational changes may be made without departing from the scope of the present invention.

The foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for providing a method, apparatus, and article of manufacture for providing network based processing system providing processing services to remote clients.

What is claimed is:

1. A computer implemented method of activating a requested processing component initiated by a calling component within a computing system, the method comprising:

determining the identity of the requested processing component, including an identity of a unique component class ID from a request to activate a component initiated by a calling component;

obtaining configuration data for the requested component, the configuration data comprises one or more component parameters for the requested component;

if the configuration data indicates that the requested component is a component object alias, substituting a unique component class ID for the component alias class ID; and activating an instance of the requested component.

2. The method according to claim 1, wherein the component parameters comprise a public/private component parameter, a transactions enabled parameter, a queuing messages enable parameter, a security level parameter; a user ID group parameter, and a construction string parameter.

3. The method according to claim 2, wherein the configuration data for the requested component further comprises a unique component class ID, a component alias class ID, and an executable code module ID.

4. The method according to claim 3, wherein the configuration data for the requested component is stored within a catalog entry record within a system catalog database.

5. A computer program data product readable by a computing system and encoding instructions for implementing a computer method of activating a requested processing component initiated by a calling component within a local computing system, the method comprising:

determining the identity of the requested processing component, including an identity of a unique component class ID from a request to activate a component initiated by a calling component;

obtaining configuration data for the requested component, the configuration data comprises one or more component parameters for the requested component;

if the configuration data indicates that the requested component is a component object alias, substituting a unique component class ID for the component alias class ID; and activating an instance of the requested component.

6. The computer data product according to claim 5, wherein the component parameters comprise a public/private component parameter, a transactions enabled parameter, a queuing messages enable parameter, a security level parameter, a user ID group parameter, and a construction string parameter.

7. The computer data product according to claim 6, wherein the configuration data for the requested component further comprises a unique component class ID, a component alias class ID, a unique component partition ID, and an executable code module ID.

8. The computer data product according to claim 7, wherein the configuration data for the requested component is stored within a catalog entry record within a system catalog database.

9. The computer data product according to claim 7, wherein the computer data product comprises a computer-readable data storage medium.

10. The computer data product according to claim 7, wherein the computer data product comprises a computer readable carrier wave communicating between two or more computers encoding instructions for implementing the method.

11. A computing system for activating a requested processing component initiated by a calling component within a local computing system, the computing system comprising:

a partition activation control module for receiving a request to activate a component initiated by a calling component and activating an instance of the requested component;

a permit object activation module for determining whether an instance of the requested component may be activated;

a component object alias activation module for substituting a unique component class ID for a component alias class ID if the requested component corresponds to a component object alias;

a system component catalog database for maintaining component object configuration data; and a component object activation module for activating the requested component.

12. The computing system according to claim 11, wherein the permit object activation module determines if the requested component is a public component using component configuration data.

13. The computing system according to claim 12, wherein the permit object activation module determines if the requested component is a public component using component configuration data.

14. The computing system according to claim 13, wherein an instance of the request component is activated when the requested component is a public component.

15. The computing system according to claim 14, wherein an instance of the requested component is activated when the requested component is a private component only when the calling component is a member of the same application in which the requested component is a member.

16. The computer data product according to claim 15, wherein the configuration data for the requested component is stored within a catalog entry record within a system catalog database.

17. The computing system according to claim 16, wherein the component parameters comprise a public/private component parameter, a transactions enabled parameter, a queuing messages enable parameter, a security level parameter, a user ID group parameter, and a construction string parameter.

18. The computing system product according to claim 17, wherein the configuration data for the requested component further comprises a unique component class ID, a component alias class ID, a unique component partition ID, and an executable code module ID.

* * * * *

UNITED STATES PATENT AND TRADEMARK OFFICE
CERTIFICATE OF CORRECTION

PATENT NO.    : 6,687,717 B1
DATED         : February 3, 2004
INVENTOR(S)   : Hamilton et al.

It is certified that error appears in the above-identified patent and that said Letters Patent is hereby corrected as shown below:

<u>Column 8,</u>
Line 66, "existing-component" should read -- existing component --

<u>Column 11,</u>
Line 20, "level parameter; a user" should read -- level parameter, a user --

Signed and Sealed this

Fifteenth Day of June, 2004

JON W. DUDAS
*Acting Director of the United States Patent and Trademark Office*